United States Patent
Kaito et al.

(10) Patent No.: US 8,017,692 B2
(45) Date of Patent: Sep. 13, 2011

(54) RESIN COMPOSITION FOR METAL PLATING, MOLDED ARTICLE THEREOF, AND METAL-PLATED MOLDED ARTICLE

(75) Inventors: Hiroyoshi Kaito, Tokyo (JP); Takashi Kurata, Tokyo (JP); Toshiyuki Higashijima, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 107 days.

(21) Appl. No.: 12/312,773

(22) PCT Filed: Nov. 20, 2007

(86) PCT No.: PCT/JP2007/072441
§ 371 (c)(1),
(2), (4) Date: May 27, 2009

(87) PCT Pub. No.: WO2008/062779
PCT Pub. Date: May 29, 2008

(65) Prior Publication Data
US 2010/0068615 A1   Mar. 18, 2010

(30) Foreign Application Priority Data
Nov. 22, 2006   (JP) ................. 2006-315031

(51) Int. Cl.
*C08F 8/00* (2006.01)
*C08L 9/00* (2006.01)
*C08L 23/00* (2006.01)
*C08L 25/02* (2006.01)
*B05D 1/36* (2006.01)

(52) U.S. Cl. ........ 525/191; 525/232; 525/240; 525/241; 428/461; 428/462; 427/405; 427/407.1

(58) Field of Classification Search .................. 525/191, 525/232, 240, 241; 428/461, 462; 427/405, 427/407.1
See application file for complete search history.

(56) References Cited

U.S. PATENT DOCUMENTS
2002/0120062 A1   8/2002   Nagahara et al.

FOREIGN PATENT DOCUMENTS

| | | |
|---|---|---|
| JP | H07-268138 A | 10/1995 |
| JP | 2000-154291 A | 6/2000 |
| JP | 2002-256043 A | 9/2002 |
| JP | 2004-210871 A | 7/2004 |
| JP | 2004-307739 A | 11/2004 |
| JP | 2005-015690 A | 1/2005 |
| JP | 2007-227121 A | 9/2007 |

OTHER PUBLICATIONS

First Office Action corresponding with Chinese Application No. 200780043334.5 dated Apr. 6, 2011, 9 pages (in Chinese/English).
Supplementary European Search Report issued against EPO Application 07832171.8 dated May 9, 2011, 4 pages.

*Primary Examiner* — Nathan M Nutter
(74) *Attorney, Agent, or Firm* — Fitch, Even, Tabin & Flannery

(57) ABSTRACT

A resin composition for metal plating provides a molded article exhibiting excellent metal plating adhesion strength and chemical resistance, while having excellent productivity. A metal-plated molded article can also be made from such a resin composition. The resin composition for metal plating includes 50-90% by mass of Component (A) and 10-50% by mass of Component (B), the total of Component (A) and Component (B) being 100% by mass, wherein Component (A) is a polypropylene resin, and Component (B) is a rubber-reinforced vinyl resin obtained by polymerizing a vinyl monomer in the presence of a rubber-like polymer, or a mixture of the rubber-reinforced vinyl resin and a (co)polymer of the vinyl monomer. The composition may further include 0.5-30 parts by mass of a compatibilizer (C) per 100 parts by mass of the total of Component (A) and Component (B). Component (B) is preferably a non-diene rubber-reinforced resin.

9 Claims, No Drawings

RESIN COMPOSITION FOR METAL PLATING, MOLDED ARTICLE THEREOF, AND METAL-PLATED MOLDED ARTICLE

CROSS-REFERENCE TO RELATED APPLICATIONS

This is a U.S. National Phase of International Application PCT/JP2007/072441, filed Nov. 20, 2007, and claims foreign priority under 35 U.S.C. §119 based on Japanese Application No. 2006-315031, filed Nov. 22, 2006, the entire disclosures of which applications are hereby incorporated herein by reference.

TECHNICAL FIELD

The present invention relates to a composition comprising a polypropylene resin and a rubber-reinforced resin, and more specifically relates to a resin composition for metal plating excellent in metal plating adhesion strength (peeling strength) and chemical resistance, a molded article thereof and a metal-plated molded article.

BACKGROUND ART

Since rubber-reinforced resins represented by ABS resins have excellent workability, impact resistance, mechanical properties and chemical resistance, they are used in a wide range of fields including the field of vehicles and the field of household appliances as molding materials for various constituent parts. For the above various constituent parts, as a method for imparting luxury, durability and better feeling of touch, metal plating on the surface of the constituent parts has been employed. Particularly, molded articles of rubber-reinforced resins are noticed since they can be metal-plated on a surface thereof, and are widely used as metal-plated molded parts including door mirrors, radiator-grilles, knobs, housings and caps of cosmetic containers.

Recently, durability of metal-plated constituent parts is required, and a resin composition for metal plating which is more excellent in metal plating adhesion strength and chemical resistance than before is also required with expansion of application fields.

Conventionally, various methods have been attempted for improving metal plating adhesion strength of rubber-reinforced resins represented by ABS resins. For example, Patent Document 1 has proposed a method of blending predetermined amounts of a rubber-containing graft copolymer and two AS resins different in average molecular weight and content of vinyl cyanide monomers, the rubber-containing graft copolymer being obtained by polymerizing vinyl monomers in the presence of two diene-rubber polymers different in gel content and degree of swelling. Patent Document 2 has proposed a method in which a rubber-reinforced resin is adjusted to have specific ranges of content of rubbers, content of vinyl cyanide monomers in the acetone-soluble matter, Mw/Mn ratio in the acetone-soluble matter and Mz/Mn ratio in the acetone-soluble matters.

The method disclosed in Patent Document 1 requires use of two kinds of diene rubbers and two kinds of AS resins different in properties, and thus the process for producing the rubber-reinforced resin is complicated, and metal plating adhesion strength and chemical resistance are still insufficient for some applications such that further improvement is required. The method disclosed in Patent Document 2 is complicated due to processes for adjusting the Mw/Mn and Mz/Mn ratios of the acetone-soluble matter to specific ranges, and metal plating adhesion strength and chemical resistance are still insufficient for some applications such that further improvement is required. In addition, when metal-plated molded articles are used as battery cell casings for lithium ion rechargeable batteries, they are required to have chemical resistance because they contact an electrolyte solution, and are also required to prevent moisture from invading from the outside.

[Patent Document 1]: JP-A-2000-154291
[Patent Document 2]: JP-A-2002-256043

SUMMARY AND OBJECTS OF THE INVENTION

The object of the present invention is to provide a resin composition for metal plating which is excellent in productivity of the resin composition for metal plating and capable of providing a molded article excellent in metal plating adhesion strength and chemical resistance, as well as a molded article and a metal-plated molded article formed of the resin composition.

The present inventors have conducted intensive studies in order to achieve the above object and consequently have found that the above problems can be solved by blending a rubber-reinforced resin and a polypropylene resin in specific amounts. Thus, the present invention has been completed.

That is, according to an aspect of the present invention, there is provided a resin composition for metal plating, which comprises 50-90 mass % of the following Component (A) and 10-50 mass % of the following Component (B), provided that the total of Components (A) and (B) is 100 mass %.
Component (A): a polypropylene resin; and
Component (B): a rubber-reinforced vinyl resin obtained by polymerization of a vinyl monomer in a presence of a rubber-like polymer, or a mixture of the rubber-reinforced vinyl resin and a (co)polymer of the vinyl monomer.

According to a preferable embodiment, the resin composition further comprises 0.5-30 parts by mass of a compatibilizer (C) relative to 100 parts by mass of the total of the above Components (A) and (B).

The above compatibilizer (C) is preferably the following Component (C1) and/or Component (C2).
Component (C1): a hydrogenated conjugated diene polymer having a hydrogenation ratio of 10% or more; and
Component (C2): a copolymer obtained by polymerization of a vinyl monomer in a presence of a polypropylene resin, said vinyl monomer comprising an aromatic vinyl compound and a vinyl cyanide compound.

According to another preferable embodiment, in a resin composition of the present invention, the above Component (B) comprises a rubber-reinforced vinyl resin obtained by polymerization of a vinyl monomer in a presence of a non-diene rubber polymer, or a mixture of the rubber-reinforced vinyl resin and a (co)polymer of the vinyl monomer.

In addition, according to another aspect of the present invention, there is provided a molded article formed of the above resin composition for metal plating of the present invention and a metal-plated molded article which is the above molded article that is metal-plated on at least part of the surface thereof.

Further, according to another aspect of the present invention, there is provided a battery cell casing which at least comprises a molded article formed of the present resin composition for metal plating, and a metal plating layer formed on the surface thereof.

In addition, according to still another aspect of the present invention, there is provided a method for producing a battery cell casing characterized in that it comprises molding a resin composition for metal plating comprising 50-90 mass % of the following Component (A) and 10-50 mass % of the following Component (B), provided that the total of Components (A) and (B) is 100 mass %, and then metal-plating the molded article to laminate a metal-plating layer onto the molded article.

EFFECTS OF THE INVENTION

The diene rubber-reinforced resin using a diene rubber as a rubber-like polymer are, by themselves, excellent in metal plating adhesion but poor in chemical resistance (refer to Comparative Examples IV-1 and IV-2). In addition, the non-diene rubber-reinforced resin using a non-diene rubber as a rubber-like polymer are, by themselves, excellent in chemical resistance, but inferior in plating adhesion (refer to Comparative Example IV-3). The polypropylene resin is, by themselves, excellent in chemical resistance, but has no plating adhesion (refer to Comparative Examples IV-4).

In contrast, according to the present invention, predetermined amounts of a rubber-reinforced resin and a polypropylene resin are mixed, and, as a result, a resin composition excellent in productivity and capable of giving a molded articles excellent in metal plating adhesion strength and chemical resistance is obtained (refer to Examples I-1-I-5, II-1-II-5, III-1-III-3 and IV-1).

Particularly, it is unexpected and surprising that the resin composition of the present invention which comprises a polypropylene resin having no planting adhesion with which a predetermined amount of a diene rubber-reinforced resin is blended has shown more excellent plating adhesion than the diene rubber-reinforced resin alone (refer to Examples I-1-I-5).

Also, it is unexpected and surprising that the resin composition of the present invention which comprises a polypropylene resin having no plating adhesion with which a predetermined amount of a non-diene rubber-reinforced resin similarly inferior in metal plating adhesion is blended has shown more excellent plating adhesion and impact resistance not only than the respective resins but also than the diene rubber-reinforced resin which has been said to be excellent in plating adhesion (refer to Examples II-1-II-4, III-1-III-2 and IV-1).

Therefore, the metal-plated molded article of the present invention is excellent in chemical resistance and water vapor transmission resistance due to the metal-plating layer thereof, and thus is useful for battery cell casings, particularly battery cell casings for lithium ion rechargeable batteries.

BEST MODE FOR CARRYING OUT THE INVENTION

Hereinafter, the embodiment of the present invention is described in detail. In this specification, the term "(co)polymer" means homopolymer and copolymer, the term "(meth)acryl" means acryl and/or methacryl, and the term "(meth)acrylate" means acrylate and/or methacrylate.

A resin composition for metal plating of the present invention basically comprises the above Components (A) and (B), and the above Component (C), if required.
Component (A) (Polypropylene Resin)

Examples of the polypropylene resin (A) used as Component (A) in the present invention include a homopolymer of propylene, a random or block copolymer which is composed mainly of propylene and further contains ethylene or an α-olefin with not less than 4 carbon atoms as a comonomer, and a mixture of these.

The polypropylene resin (A) of the present invention has a melt flow rate (MFR) measured at a temperature of 230° C. with a load of 2.16 kg of usually 0.1-200 g/10 min, preferably 1-150 g/10 min and more preferably 2-100 g/10 min, a molecular weight distribution (Mw/Mn) measured by GPC of usually 1.2-10, preferably 1.5-8 and more preferably 2-6, and a melting point (Tm) of usually 150-170° C. and preferably 155-167° C.

Production methods for the polypropylene resin (A) of the present invention are not particularly limited as long as the above MFR, molecular weight distribution and melting point are satisfied, but it is usually produced using a Zieglar-Natta (ZN) catalyst or metallocene catalyst.

As a Zieglar-Natta (ZN) catalyst, a highly active catalyst is preferable, and a highly active catalyst composed of a solid catalyst component containing magnesium, titanium, halogen and an electron donor as essential components in combination with an organic aluminum compound is especially preferable.

As a metallocene catalyst, a catalyst composed of a metallocene complex in which an organic compound having a cyclopentadienyl skeleton and a halogen atom are coordinated to a transition metal such as zirconium, hafnium and titanium in combination with an alumoxane compound, ion exchange silicate, organic aluminum compound or the like is effective.

A comonomer to be copolymerized with propylene includes, for example, ethylene, butene-1, pentene-1, hexene-1 and 4-methyl-pentene-1. The content of these comonomer components is usually 0-15 mass % and preferably 0-10 mass % relative to 100 mass % of the total amount of the copolymer. Of these, particularly preferable is a block copolymer of propylene and ethylene and/or butane-1.

The ratio of the amount of each monomer in the reaction solution does not have to be always constant. Each monomer may be supplied in a constant mixing ratio, or may be supplied in a mixing ratio which is changed with lapse of time. Also, considering copolymer reaction ratio, either of the monomers can be dividedly added.

Any method of polymerization in a manner which allows the catalyst component to efficiently contact each monomer can be employed. Specific examples which can be adopted include a slurry method using an inactive solvent, a bulk method using substantially no inactive solvent but propylene as a solvent, a solution method, and a vapor deposition method using substantially no liquid solvent but keeping each monomer in substantially gaseous form.

In addition, any one of continuous polymerization and batch polymerization may be used. In case of slurry polymerization, as a polymerization solvent, a saturated aliphatic or aromatic hydrocarbon such as hexane, heptane, pentane, cyclohexane, benzene and toluene can be used alone or in combination.

As to polymerization conditions, polymerization temperature is usually −78 to 160° C. and preferably 0 to 150° C., and in this instance, hydrogen can be auxiliary used as a molecular weight regulator. In addition, polymerization pressure is usually 0-90 kg/cm$^2$·G, preferably 0-60 kg/cm$^2$·G and particularly preferably 1-50 kg/cm$^2$·G.

The amount to be used of Component (A) constituting the resin composition of the present invention is 50-90 mass %, preferably 55-85 mass %, more preferably 60-80 mass % and particularly preferably 65-80 mass %, provided that the total of Components (A) and (B) is 100 mass %. When the amount of Component (A) is too small, chemical resistance is inferior, and when the amount of Component (A) is too large, plating adhesion is inferior.

Component (B) (A Rubber-Reinforced Vinyl Resin or a Mixture of this and a Vinyl (Co)Polymer)

Component (B) used in the present invention may be a rubber-reinforced vinyl resin (B1) obtained by polymerization of a vinyl monomer (b) in the presence of a rubber-like polymer (a) and/or a mixture of the rubber-reinforced vinyl resin (B1) and a (co)polymer (B2) of the vinyl monomer. This (co)polymer of the vinyl monomer is a compound which is obtained by polymerization of the vinyl monomer (b) in the absence of the rubber-like polymer (a). In the present specification, Component (B) is collectively referred to as "rubber-reinforced resin", and "rubber-reinforced vinyl resin" is used to refer to Component (B1) only.

The content of the rubber-like polymer (a) in the above Component (B) is preferably 3-80 mass %, further preferably 5-70 mass % and particularly preferably 15-70 mass %, provided that the Component (B) is 100 mass %. The above range is preferable because impact resistance tends to be improved.

Examples of the above rubber-like polymer (a) include, but not particularly limited to, a diene rubber polymer and a non-diene rubber polymer. Examples of the diene rubber polymer include polybutadiene, butadiene-styrene copolymers, butadiene-acrylonitrile copolymers and hydrogenated products thereof having a hydrogenation ratio of less than 50%. Examples of the non-diene rubber polymer include a hydrogenated product of the diene rubber polymer having a hydrogenation ratio of not less than 50%; ethylene-α-olefin copolymer rubbers such as ethylene-propylene copolymers, ethylene-propylene-non-conjugated diene copolymers, ethylene-butene-1 copolymers, and ethylene-butene-1-non-conjugated diene copolymers; acrylic rubbers; silicone rubbers; and silicone-acrylic IPN rubbers. These can be used alone or in combination of two or more.

Among the above diene rubber polymers, polybutadiene, butadiene-styrene copolymers and hydrogenated products thereof (having a hydrogenation ratio of less than 50%) are preferable. The butadiene-styrene copolymer used here includes a block copolymer and a random copolymer.

Among the above non-diene rubber polymers, ethylene-α-olefin copolymer rubbers, acrylic rubbers and silicone rubbers are preferable. Of these, more preferable examples of the non-diene rubber polymer include ethylene-α-olefin copolymer rubbers, and particularly preferable examples of the non-diene rubber polymer include ethylene-propylene copolymers and ethylene-propylene-non-conjugated diene copolymers. The content of ethylene unit in the ethylene-α-olefin copolymer rubber is 20-80 mass %, and preferably 30-70 mass % relative to the total of the units. When it is less than 20 mass %, sufficient improvement of impact resistance cannot be obtained.

In the present invention, the rubber-reinforced vinyl resin obtained by polymerization of the vinyl monomer in the presence of the diene rubber polymer, or a mixture of this rubber-reinforced vinyl resin and the (co)polymer of the vinyl monomer is collectively referred to as "diene rubber-reinforced resin". The rubber-reinforced vinyl resin obtained by polymerization of the vinyl monomer in the presence of the non-diene rubber polymer, or a mixture of this rubber-reinforced vinyl resin and the (co)polymer of the vinyl monomer is collectively referred to as "non-diene rubber-reinforced resin".

The gel content of the above rubber-like polymer (a) is not particularly limited, but when the component (a) is obtained by emulsion polymerization, the gel content is preferably not more than 98 mass % and further preferably 40 to 98 mass %. In this range, a resin composition giving resinous molded articles excellent particularly in impact resistance can be obtained.

The above gel content can be determined by the following method. That is, 1 g of the rubber-like polymer is added to 100 ml of toluene, and the mixture is allowed to stand still at room temperature for 48 hours. The mixture is then filtered through a 100 mesh metal screen (the mass is defined as $W_1$ grams), and the filtered toluene-insoluble matter and the metal screen are vacuum-dried for 6 hours at 80° C., and are weighed (the mass is defined as $W_2$ grams). The gel content is calculated by the following equation (1).

$$\text{Gel content (mass \%)} = [\{W_2(g) - W_1(g)\}/1(g)] \times 100 \quad (1)$$

The gel content is adjusted by appropriately setting kind and amount of molecular weight modifiers, polymerization time, polymerization temperature, polymerization conversion and the like during the production of the rubber-like polymer.

Components which constitute the above vinyl monomer (b) include, for example, aromatic vinyl compounds, vinyl cyanide compounds, (meth)acrylate compounds, maleimide compounds and various other functional group-containing unsaturated compounds. These can be used alone or in combination of two or more.

The vinyl monomer (b) of the present invention preferably comprises an aromatic vinyl compound as an essential monomer component, and if necessary, comprises one or two or more selected from the group consisting of vinyl cyanide compounds, (meth)acrylate compounds and maleimide compounds as additional monomer components, and if further necessary, comprises at least one of the various other functional group-containing unsaturated compounds as additional monomer components. The various other functional group-containing unsaturated compounds include, for example, unsaturated acid compounds, epoxy group-containing unsaturated compounds, hydroxyl group-containing unsaturated compounds, oxazoline group-containing unsaturated compounds, acid anhydride group-containing unsaturated compounds, and substituted or unsubstituted amino group-containing unsaturated compounds. The various other functional group-containing unsaturated compounds can be used alone or in combination of two or more. Examples of aromatic vinyl compounds include styrene, α-methylstyrene and hydroxystyrene. Of these, styrene and α-methylstyrene are preferable.

The vinyl cyanide compounds include, for example, acrylonitrile and methacrylonitrile, and these can be used alone or in combination of two or more. When the vinyl cyanide compound is used, chemical resistance is imparted. When the vinyl cyanide compound is used, the amount to be used thereof is preferably 1-60 mass %, more preferably 5-50 mass % relative to the component (b).

The (meth)acrylate compounds include, for example, methyl acrylate, ethyl acrylate, butyl acrylate, methyl methacrylate, ethyl methacrylate and butyl methacrylate, and these can be used alone or in combination of two or more. Use of the (meth)acrylate compound improves surface hardness, and thus preferable. When the (meth)acrylate compound is used, the amount to be used thereof is preferably 1-80 mass %, more preferably 5-80 mass % relative to the component (b).

The maleimide compounds include, for example, maleimide, N-phenylmaleimide and N-cyclohexylmaleimide, and these can be used alone or in combination of two more. In order to introduce a maleimide unit, maleic anhydride is first copolymerized, and then imidation may be performed. When the maleimide compound is used, heat resistance is imparted. When the maleimide compound is used, the amount to be used thereof is preferably 1-60 mass %, more preferably 5-50 mass % relative to the component (b).

The unsaturated acid compounds include, for example, acrylic acid, methacrylic acid, ethacrylic acid, maleic acid, fumaric acid, itaconic acid, crotonic acid and cinnamic acid, and these can be used alone or in combination of two or more.

The epoxy group-containing unsaturated compounds include, for example, glycidyl acrylate, glycidyl methacrylate and allyl glycidyl ether, and these can be used alone or in combination of two or more.

The hydroxyl group-containing unsaturated compounds include, for example, 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl methacrylate, 2-hydroxyethyl acrylate and N-(4-hydroxyphenyl)maleimide, and these can be used alone or in combination of two or more.

The oxazoline group-containing unsaturated compounds include, for example, vinyl oxazoline, and these can be used alone or in combination of two or more.

The acid anhydride group-containing unsaturated compounds include, for example, maleic anhydride, itaconic anhydride and citraconic anhydride, and these can be used alone or in combination of two or more.

The substituted or unsubstituted amino group-containing unsaturated compounds include, for example, aminoethyl acrylate, propylaminoethyl acrylate, dimethylaminoethyl methacrylate, phenylaminoethyl methacrylate, N-vinyldiethylamine, N-acetylvinylamine, acrylamine, methacrylamine, N-methylacrylamine, acrylamide, N-methylacrylamide and p-aminostyrene, and these can be used alone or in combination of two or more.

When various other functional group-containing unsaturated compounds as above are used, it can be expected that a blend of the Component (A) with Component (B) will be improved in compatibility of the two. Preferable monomers for attaining such an effect are epoxy group-containing unsaturated compounds, unsaturated acid compounds and hydroxyl group-containing unsaturated compounds.

The amount to be used of the above various other functional group-containing unsaturated compounds in the Component (B) is preferably 0.1-20 mass %, more preferably 0.1-10 mass % as the total amount of the functional group-containing unsaturated compounds relative to the Component (B).

The amount to be used of the monomers other than the aromatic vinyl compounds in the vinyl monomer (b) is preferably not more than 80 mass %, more preferably not more than 60 mass % and particularly preferably not more than 40 mass %, provided that the total of the vinyl monomer (b) is 100 mass %.

More preferable combinations of monomers constituting the vinyl monomer (b) include, for example, aromatic vinyl compound/(meth)acrylonitrile, aromatic vinyl compound/methyl methacrylate, aromatic vinyl compound/(meth)acrylonitrile/methyl methacrylate, aromatic vinyl compound/(meth)acrylonitrile/glycidyl methacrylate, aromatic vinyl compound/(meth)acrylonitrile/2-hydroxyethyl methacrylate, aromatic vinyl compound/(meth)acrylonitrile/(meth)acrylic acid, aromatic vinyl compound/N-phenylmaleimide, and aromatic vinyl compound/methyl methacrylate/cyclohexylmaleimide. Particularly preferable combinations of monomers to be polymerized in the presence of a rubber-like polymer (a) include, for example, aromatic vinyl compound/(meth)acrylonitrile=65/45 to 90/10 (mass ratio), aromatic vinyl compound/methyl methacrylate=80/20 to 20/80 (mass ratio), and aromatic vinyl compound/(meth)acrylonitrile/methyl methacrylate in which the amount of aromatic vinyl compound is 20-80 mass % and the amount of the total of (meth)acrylonitrile and methyl methacrylate is 20-80 mass %. As the aromatic vinyl compound here, styrene and α-methylstyrene are preferably used.

The Component (B) can be produced by known polymerization methods such as emulsion polymerization, bulk polymerization, solution polymerization, suspension polymerization, and polymerization methods of combination of these. Among these, preferable polymerization methods for the rubber-reinforced vinyl resin are emulsion polymerization and solution polymerization. On the other hand, preferable polymerization methods for the (co)polymer of the vinyl monomer (b) obtained in the absence of the rubber-like polymer (a) are bulk polymerization, solution polymerization, suspension polymerization and emulsion polymerization.

When the production is performed by emulsion polymerization, polymerization initiators, chain transfer agents, emulsifiers and the like are used, and all of these may be conventionally known ones.

The polymerization initiator includes, for example, cumene hydroperoxide, p-menthane hydroperoxide, diisopropyl benzene hydroperoxide, tetramethylbutyl hydroperoxide, tert-butyl hydroperoxide, potassium persulfate, and azobisisobutyronitrile.

Further, as a polymerization initiation aid, redox systems such as various kinds of reducing agents, a sugar-containing iron pyrophosphate formulation and a sulfoxylate prescription are preferably used.

The chain transfer agent includes, for example, octyl mercaptan, n-dodecyl mercaptan, t-dodecyl mercaptan, n-hexyl mercaptan, and terpinolenes.

The emulsifier includes, for example, alkylbenzenesulfonates such as sodium dodecylbenzenesulfonate, aliphatic sulfonates such as sodium lauryl sulfate, higher fatty acid salts such as potassium laurate, potassium stearate, potassium oleate and potassium palmitate, and rosin acid salts such as potassium rosinate.

Referring to the manner of using the rubber-like polymer (a) and the vinyl monomer (b) in emulsion polymerization of the rubber-reinforced vinyl resin, the vinyl monomer (b) may be entirely added and polymerized in the presence of the whole amount of the rubber-like polymer (a), or may be dividedly or continuously added and polymerized. Further, a part of the rubber-like polymer (a) may be added in the course of polymerization.

After emulsion polymerization, the obtained latex is usually made to coagulate with a coagulant, and then washed with water and dried to give a powder of the rubber-reinforced vinyl resin. At this time, two or more kinds of latexes of the rubber-reinforced vinyl resin obtained by emulsion polymerization may suitably be blended, and then coagulated. The coagulant used here includes inorganic salts such as calcium chloride, magnesium sulfate and magnesium chloride, and acids such as sulfuric acid, hydrochloric acid, acetic acid, citric acid and malic acid.

A solvent which can be used when a Component (B) is produced by solution polymerization is an inert solvent for polymerization, which is used for ordinary radical polymerization. Examples thereof include aromatic hydrocarbons such as ethylbenzene and toluene, ketones such as methyl ethyl ketone and acetone, acetonitrile, dimethylformamide, N-methylpyrrolidone, and the like.

The polymerization temperature is preferably in a range of 80-140° C., more preferably 85-120° C.

During polymerization, a polymerization initiator may be used, or polymerization may be conducted by thermal polymerization without using a polymerization initiator. The polymerization initiator that is preferably used includes, for example, organic peroxides such as ketone peroxide, dialkyl peroxide, diacyl peroxide, peroxyester, hydroperoxide, azobisisobutyronitrile and benzoyl peroxide, and 1,1'-azobis(cyclohexane-1-carbonitrile).

In addition, when a chain transfer agent is used, it may be, for example, mercaptans, terpenolenes, and α-methylstyrene dimers.

When a production is performed by bulk polymerization or suspension polymerization, the polymerization initiators, the chain transfer agents, etc. described concerning solution polymerization can be used.

The amount of monomers remaining in the Component (B) obtained by the above respective polymerization method is preferably not more than 10,000 ppm, further preferably not more than 5,000 ppm.

The rubber-reinforced vinyl resin (B1) usually includes a copolymer in which the above vinyl monomer (b) is graft-copolymerized onto the rubber-like polymer (a) and an ungrafted component which is not grafted onto the rubber-like polymer.

The graft ratio of the above rubber-reinforced vinyl resin is preferably 20-200 mass %, further preferably 30-150 mass %, and particularly preferably 40-120 mass %, and the graft ratio can be determined by the following equation (2).

$$\text{Graft ratio (mass \%)} = \{(T-S)/S\} \times 100 \quad (2)$$

In the above equation (2), T is the mass (g) of insoluble matter obtained by adding 1 g of the rubber-reinforced vinyl resin to 20 ml of acetone (but acetonitrile, when an acrylic rubber is used in the rubber-like polymer (a)), shaking the mixture for 2 hours by a shaker, and then centrifuging the mixture by a centrifuge (at a rotation speed of 23,000 rpm) for 60 minutes to separate the insoluble matter from the soluble matter, and S is the mass (g) of the rubber-like polymer contained in 1 g of the rubber-reinforced vinyl resin.

The limiting viscosity [η] (measured at 30° C. using methyl ethyl ketone as a solvent) of the soluble matter in acetone (but acetonitrile, when acrylic rubber is used in the rubber-like polymer (a)) of the Component (B) of the present invention is preferably 0.2-1.2 dl/g, further preferably 0.2-1.0 dl/g, and particularly preferably 0.3-0.8 dl/g.

The average particle diameter of the grafted rubber-like polymer particles dispersed in the Component (B) of the present invention is preferably 500-30,000 Å, further preferably 1,000-20,000 Å, and particularly preferably 1,500-8,000 Å. The average particle diameter can be measured by a conventional method using an electron microscope.

The Component (B) in the present invention is preferably a non-diene rubber-reinforced resin. When the non-diene rubber-reinforced resin is used, a resin composition furthermore excellent in metal plating property, chemical resistance and impact strength compared with the dien rubber-reinforced resin is obtained.

The non-diene rubber-reinforced resin and the diene rubber-reinforced resin may be used in combination as the Component (B). In this case, the amount to be used of the diene rubber-reinforced resin and the non-diene rubber-reinforced resin is preferably 10-90/90-10 (mass %), and more preferably 15-85/85-15 (mass %) in terms of the ratio of the diene rubber-reinforced vinyl resin/the non-diene rubber-reinforced vinyl resin, provided the total of the diene rubber-reinforced vinyl resin and the non-diene rubber-reinforced vinyl resin is 100 mass %. In this range of addition ratio, a resin composition, which maintains the excellent properties (such as coloration, weld appearance, gloss of molded articles) derived from the diene rubber-reinforced resin and is excellent in plating adhesion, chemical resistance and impact resistance, can be obtained.

The amount to be used of the Component (B) constituting the present resin composition is 10-50 mass %, preferably 15-45 mass % and more preferably 20-40 mass %, and particularly preferably 20-35 mass %, provided that the total of Components (A) and (B) is 100 mass %. When the amount of the Component (B) is too small, metal plating adhesion and impact resistance are inferior, and when the amount of the Component (B) is too large, chemical resistance is inferior.

Compatibilizer (C)

The compatibilizer (C) used in the resin composition of the present invention is not particularly limited as long as it has a property of compatibilizing the above predetermined amounts of Components (A) and (B). The compatibilizer includes, for example, conjugated-diene polymers represented by styrene thermoplastic elastomers such as styrene-butadiene copolymers, styrene-isoprene copolymers and hydrogenated products thereof, acrylic thermoplastic elastomers, and ethylene-ethyl acrylate-maleic anhydride copolymers. The use of such a compatibilizer makes it possible to provide a composition which has the Component (B) dispersed with an aimed average particle diameter in the Component (A) and has excellent properties, plating adhesion and chemical resistance. These compatibilizers can be used alone or in combination of two or more.

Of these compatibilizers, conjugated-diene polymers and hydrogenated products thereof (C1), especially hydrogenated conjugated-diene polymers are preferable, and copolymers (C2) obtained by polymerization of a vinyl monomer comprising an aromatic vinyl compound and a vinyl cyanide compound in the presence of a polypropylene resin are also preferable.

The conjugated-diene rubber polymer constituting the conjugated-diene polymer (C1) includes, for example, polymers of conjugated-diene compounds and copolymers of conjugated-diene compounds and other vinyl monomers which are copolymerizable with conjugated-diene compounds.

The conjugated-diene compound includes, for example, butadiene, isoprene, piperylene, methyl pentadiene, phenyl butadiene, 3,4-dimethyl-1,3-hexadiene and 4,5-diethyl-1,3-octadiene. These can be used alone or in combination of two or more. Preferable are butadiene and isoprene.

The other vinyl monomer copolymerizable with the conjugated-diene compound includes, for example, aromatic vinyl compounds, vinyl cyanide compounds, alkyl (meth) acrylates, maleimide compounds, unsaturated acid compounds, epoxy group-containing unsaturated compounds, hydroxyl group-containing unsaturated compounds, oxazoline group-containing unsaturated compounds, acid anhydride group-containing unsaturated compounds, and substituted or non-substituted amino group-containing unsaturated compounds. These can be used alone or in combination of two or more. Of these, aromatic vinyl compounds are preferably used.

Aromatic vinyl compounds include, for example, styrene, α-methylstyrene, o-methylstyrene, p-methylstyrene, vinyl toluene, brominated styrene, hydroxystyrene and divinylbenzene. These can be used alone or in combination of two or more. Of these, styrene is preferable.

In the hydrogenated conjugated-diene polymer (C1) preferably used as the Component (C), the hydrogenation ratio of the diene portions is preferably not less than 10%, more preferably 10-95%, furthermore preferably 20-70% and particularly preferably 30-65%. In the above range, dispersibility of the Components (A) and (B) is improved, and properties such as impact resistance, chemical resistance and plating adhesion of the targeted resin molded articles become well-balanced.

The hydrogenated conjugated-diene polymer preferably used as the Component (C) is preferably a compound resulting from hydrogenation of a conjugated-diene polymer composed of 0-90 mass % of aromatic vinyl compound units ($C_a$) and 10-100 mass % of conjugated-diene compound units ($C_b$). The $C_a/C_b$ ratio is preferably 10-90/90-10 mass %, more preferably 30-90/70-10 mass %, and particularly preferably 50-80/50-20 mass %.

The hydrogenated conjugated-diene polymer is preferably a copolymer with an aromatic vinyl compound, and particularly preferably has at least one aromatic vinyl compound polymer block in one molecule in order to achieve the object of the present invention. In addition, the amount of the aromatic vinyl compound to be copolymerized is particularly preferably 50-80 mass % relative to the Component (C).

A conjugated-diene polymer as a precursor of the hydrogenated conjugated-diene polymer is preferably a homo(co) polymer of the above illustrated conjugated-diene compound (one or two or more of butadiene, isoprene, piperylene, methyl pentadiene, phenyl butadiene, 3,4-dimethyl-1,3-hexadiene and 4,5-diethyl-1,3-octadiene), a random copolymer or block copolymer of the conjugated-diene compound and the aromatic vinyl compound, or a mixture thereof. When the hydrogenated conjugated-diene polymer is a mixture of different kinds of conjugated-diene polymers, they may be mixed before hydrogenation and then hydrogenated, or may be mixed after hydrogenation.

The content of 1,2- and 3,4-vinyl bonds which constitute the micro structure of the diene part of the conjugated-diene polymer as a precursor of the hydrogenated conjugated-diene polymer is preferably 10-80% relative to 100% of the total of the vinyl bond content. When impact resistance of the aimed resin molded article is particularly important, it is preferably 20-80% and more preferably 30-60%.

The number average molecular weight of the conjugated diene polymer in the Component (C) is preferably 5000-1000000, more preferably 10000-300000 and particularly preferably 20000-200000.

As the structure of the conjugated-diene compound in the Component (C), the followings (1)-(14) can be illustrated. That is, the conjugated-diene polymer may be a copolymer with a skeleton of the followings (1)-(14), or a copolymer having the basic skeleton of the followings (1)-(14) in a repeating manner. Also, it may be conjugated-diene polymers obtained by coupling them.

Hereinafter, A-C refer to the followings.
A: an aromatic vinyl compound polymer
B: a diene polymer
A/B: a random copolymer of aromatic vinyl compound/diene compound
C: a copolymer of a diene compound and an aromatic vinyl compound as a taper block in which the aromatic vinyl compound is gradually increased.
(1) A-B
(2) A-B-A
(3) A-B-C
(4) A-B1-B2 (the vinyl bond content of B1 is preferably not less than 20%, and that of B2 is preferably less than 20%)
(5) B
(6) A/B
(7) A-A/B
(8) A-A/B-C
(9) A-A/B-A
(10) B2-B1-B2 (the vinyl bond content of B1 is preferably not less than 20%, and that of B2 is preferably less than 20%)
(11) C-B
(12) C-B-C
(13) C-A/B-C
(14) C-A-B Production methods for the conjugated-diene polymer are not particularly limited, and conventional methods can be adopted. For example, a (block co)polymer can be produced by polymerization of an aromatic vinyl compound and a conjugated-diene compound in an inactive solvent with a technique of living anion polymerization using an organic lithium catalyst disclosed in Japanese Patent Publication (Kokoku) No. S36-19286. The organic lithium catalyst includes monolithium compounds such as n-butyllithium, sec-butyllithium and tert-butyllithium. Regulation of the vinyl bond content of the conjugated diene compound can be performed using amines such as N,N,N',N'-tetramethylethylenediamine, trimethylamine and triethylamine, diazobicyclo (2,2,2)octane, ethers such as tetrahydrofuran, diethylene glycol dimethylether and diethylene glycol dibutylether, thioethers, phosphines, phosphoamides, alkylbenzene sulfonates, alkoxides of potassium and sodium, etc.

A desired hydrogenated conjugated-diene polymer which can preferably be used as the Component (C) can be obtained by hydrogenation of the conjugated-diene polymer obtained above with the conventional method and also by regulation of hydrogenation ratio with the conventional method. Specific examples include methods disclosed in Japanese Patent Publication (Kokoku) Nos. S42-8704, S43-6636, S63-4841, S63-5401, Japanese Patent Application Nos. S63-285774 and S63-127400.

In case of the conjugated-diene polymer comprising the above aromatic vinyl compound polymer A and the diene polymer B in which the diene polymer B is a polymer block of 1,3-butadiene, non-selective hydrogenation allows ethylene to be generated from parts polymerized with 1,4-vinyl bond and butylene to be generated from parts polymerized with 1,2-vinyl bond, thereby yielding styrene-ethylene-butylene-styrene copolymer (SEBS) as a hydrogenated product. Selective hydrogenation of 1,2-vinyl bond generates styrene-butadiene-butylene-styrene copolymer (SBBS) as a hydrogenated product. Of these, the conjugated-diene polymer such as SBBS in which 1,2-vinyl bond is selectively hydrogenated (hereinafter referred to as selectively and partially hydrogenated conjugated-diene polymer) is preferable in the present invention.

This selectively and partially hydrogenated conjugated-diene polymer is a block copolymer having at least one aromatic vinyl compound polymer block (the above A) and at least one conjugated-diene compound polymer block (the above B) in which 10-95% of the double bonds of the conjugated-diene compound polymer block is hydrogenated. The hydrogenation ratio is more preferably 20-70%, and furthermore preferably 30-65%. Also, this selectively and partially hydrogenated conjugated-diene polymer has a ratio of the hydrogenated 1,2-vinyl bond content/the whole hydrogenated double bond content preferably in a range of 0.6-1.0, and further preferably in a range of 0.7-1.0. When the ratio of the hydrogenated 1,2-vinyl bond content/the whole hydrogenated double bond content is too low, content of hydrogenated 1,4-vinyl bonds, that is, tetramethylene unit so increases that hardness increases and processability deteriorates.

The above selectively and partially hydrogenated conjugated-diene polymer can be obtained by hydrogenation of double bonds of butadiene parts in the conjugated-diene polymer using a titanium hydrogenation catalyst. As the titanium hydrogenation catalyst, a titanium organometallic compound, or a homogeneous hydrogenation catalyst comprising the titanium organometallic compound with an organometallic compound such as of lithium, magnesium and aluminum can be used. The above selective and partial hydrogenation can be performed by appropriately regulating a catalyst content and a hydrogen supplement under the relatively mild condition of low pressure and low temperature using such a catalyst as mentioned above in accordance with Japanese Patent Publication (Kokoku) Nos. S63-4841 and H1-37970.

The above Component (C2) preferable as the Component (C) is the copolymer obtained by polymerization of a vinyl monomer comprising an aromatic vinyl compound and a vinyl cyanide compound in the presence of a polypropylene resin. As the vinyl monomer, other monomers copolymerizable with the aromatic vinyl compound or the vinyl cyanide compound may be additionally used.

The polypropylene resin includes compounds described in connection with the polypropylene resin of Component (A), and of these, propylene homopolymer is particularly preferable.

The polypropylene resin used in the Component (C2) has a melt flow rate (MFR) measured at a temperature of 230° C. with a load of 2.16 kg of usually 1-100 g/10 min, preferably 5-50 g/10 min and more preferably 5-30 g/10 min, has a molecular weight distribution (Mw/Mn) measured by GPC of usually 1.2-10, preferably 1.5-8 and more preferably 2-6, and has a melting point (Tm) of usually 150-170° C. and preferably 155-167° C.

The aromatic vinyl compound, vinyl cyanide compound and other monomers copolymerizable with these used in the Component (C2) include those described in connection with the above Component (B). Meanwhile, the aromatic vinyl compound, vinyl cyanide compound and other monomers copolymerizable with these used in the Component (C2) may be the same as or different from the compounds used in the above Component (B).

The content of the polypropylene resin in the Component (C2) is preferably 5-70 mass %, more preferably 10-60 mass % and further preferably 20-50 mass %, provided that the total copolymer of the Component (C2) is 100 mass %. In both cases where it is less than 5 mass % and it is more than 70 mass %, compatibility tends to be insufficient, and thus they are not preferable.

When an aromatic vinyl compound and a vinyl cyanide compound are used together, the mass ratio is the same as described in connection with the above Component (B).

When other copolymerizable monomers are used, the amount to be used thereof is also the same as described in connection with the above Component (B).

As a method for producing the Component (C) used in the present invention, conventionally known methods such as emulsion polymerization, bulk polymerization, suspension polymerization and solution polymerization can be used, but solution polymerization is preferable from the viewpoint of quality in particular. In addition, the solution polymerization can be practiced by any one of batch polymerization and continuous polymerization, but the continuous polymerization is preferable from the viewpoint of economy The solvent used for the solution polymerization includes, for example, an inactive solvent composed mainly of an aromatic hydrocarbon. The aromatic hydrocarbon includes, for example, benzene, toluene, ethylbenzene, xylene and i-propylbenzene, but toluene is preferable from the viewpoint of economy and quality. Although it is not problematic to use a polar solvent such as ketones, esters, ethers, amides and halogenated hydrocarbons in an amount not more than 30 mass % in the solvent, it is not preferable to use aliphatic hydrocarbons in combination. The amount to be used of the inactive solvent is usually 50-200 parts by mass and preferably 60-180 parts by mass relative to 100 parts by mass of the total of the polypropylene resin and the monomer. The polymerization temperature is preferably 80-140° C., further preferably 90-135° C. and particularly preferably 100-130° C.

Polymerization may be effected by use of a polymerization initiator, or it may be effected by thermal polymerization without use of a polymerization initiator, but it is preferably effected by use of a polymerization initiator. As the polymerization initiator, conventionally known ones can be usually used, but organic peroxides effective for graft reaction are preferably used. Organic peroxides include, for example, peroxyester compounds, dialkylperoxide compounds, diacylperoxide compounds, peroxydicarbonate compounds and peroxyketal compounds. Peroxyester compounds include, for example, cumyl peroxyneodecanoate, 1,1,3,3-tetramethylbutyl peroxyneodecanoate, t-hexyl peroxyneodecanoate, t-butyl peroxyneodecanoate, t-butyl peroxyneoheptanoate, t-hexyl peroxypivalate, t-butyl peroxypivalate, 1,1,3,3-tetramethylbutyl peroxy-2-ethylhexanoate, 2,5-dimethyl-2,5-di(2-ethylhexanoyl peroxy)hexane, t-hexyl peroxy-2-ethylhexanoate, t-butyl peroxy-2-ethylhexanoate, t-hexyl peroxyisopropyl monocarbonate, t-butyl peroxy maleic acid, t-butyl peroxy-3,5,5-trimethylhexanoate, t-butyl peroxylaurate, t-butyl peroxyisopropyl monocarbonate, t-butyl peroxy-2-ethylhexyl monocarbonate, t-hexyl peroxybenzoate, 2,5-dimethyl-2,5-di(benzoyl peroxy)hexane, t-butyl peroxyacetate, t-butyl peroxy-3-methylbenzoate, and t-butyl peroxybenzoate. Dialkyl peroxide compounds include, for example, di(2-t-butyl peroxyisopropyl)benzene, dicumylperoxide, 2,5-dimethyl-2,5-di(t-butyl peroxy)hexane, t-butylcumylperoxide, di-t-hexylperoxide, di-t-butylperoxide and 2,5-dimethyl-2,5-di(t-butyl peroxy)hexine-3. Diacylperoxide compounds include, for example, diisobutyrylperoxide, di(3,5,5-trimethylhexanoyl)peroxide, dilauroylperoxide, disuccinic acid peroxide, di-(3-methylbenzoyl)peroxide, benzoyl(3-methylbenzoyl)peroxide, dibenzoylperoxide and di(4-methylbenzoyl)peroxide. Peroxydicarbonate compounds include, for example, di-n-propyl peroxydicarbonate, diisopropyl peroxydicarbonate, di(4-t-butylcyclohexyl)peroxydicarbonate, di(2-ethylhexyl)peroxydicarbonate, and di-sec-butyl peroxydicarbonate. Peroxyketal compounds include, for example, 1,1-di(t-hexyl peroxy)-3,3,5-trimethylcyclohexane, 1,1-di(t-hexyl peroxy)cyclohexane, 1,1-di(t-butyl peroxy)-2-methylcyclohexane, 1,1-di(t-butyl peroxy)cyclohexane, 2,2-di-(t-butyl peroxy) butane, n-butyl-4,4-di(t-butyl peroxy)valerate and 2,2-di-(4,4-di-(t-butyl peroxy)cyclohexyl) propane. These can be used alone or in combination of two or more. Of these, peroxyester compounds are preferable, and t-butyl peroxyisopropyl monocarbonate is particularly preferable. The amount of the polymerization initiator to be used is 0.01-5 parts by mass, preferably 0.05-3 parts by mass and further preferably 0.1-2 parts by mass relative to 100 parts by mass of the total of the polypropylene resin and the monomer. Also, a chain transfer agent can be used, including, for example, mercaptans and α-methylstyrene dimer. Further, an antioxidant may be added if required, and addition method thereof may be blending it with the final product or may be adding it before or after polymerization.

The graft ratio of Component (C2) is preferably 20-200 mass %, further preferably 30-150 mass % and particularly preferably 40-120 mass %. This graft ratio (%) can be determined by the following equation (3).

$$\text{Graft ratio (mass \%)} = \{(T-S)/S\} \times 100 \quad (3)$$

In the above equation (3), T is the mass (g) of insoluble matter obtained by adding 1 g of Component (C2) into 20 ml of acetone, shaking the mixture for 2 hours by a shaker, and then centrifuging the mixture by a centrifuge (at a rotation speed of 23,000 rpm) for 60 minutes to separate the insoluble matter from the soluble matter, and S is the mass (g) of the polypropylene resin contained in 1 g of Component (C2).

The limiting viscosity [η] (measured at 30° C. using methyl ethyl ketone as a solvent) of the soluble matter in acetone of the Component (C2) of the present invention is preferably 0.1-1.2 dl/g, further preferably 0.15-1 dl/g, and particularly preferably 0.15-0.8 dl/g.

Component (C2) obtained by copolymerization of monomer in the presence of polypropylene resin with solution polymerization usually contains copolymers in which monomers are grafted onto polypropylene resins and ungrafted components in which no monomer is grafted onto polypropylene resins (that is, homopolymers and copolymers of the monomers).

The amount to be used of the Component (C) is preferably 0.5-30 parts by mass, further preferably 1-25 parts by mass and particularly preferably 2-20 parts by mass, provided that the total of Components (A) and (B) is 100 parts by mass. In this range of the amount to be used, a resin composition excellent in plating adhesion, chemical resistance and impact resistance can be obtained. When a non-diene rubber polymer is used as the above rubber-like polymer (a) of the above Component (A) in the resin composition of the present invention, it is preferable not to use Component (C) or to use a small amount (for example, 0-7 parts by mass relative to 100 parts by mass of the total of Components (A) and (B)) of Component (C) from the viewpoint of plating adhesion.

(D) Other Additives

With the resin composition according to the present invention, various ingredients other than the above Components (A) to (C), such as antioxidants, processing stabilizers, ultraviolet absorbents, light stabilizers, antistatic agents, crystal nucleating additives, slipping agents, plasticizers, metal inactivating agents, coloring pigments, various inorganic fillers, glass fibers, reinforcing agents, flame retardants, mold release agents and foaming agents, can be blended if required in an amount which does not impair the object of the present invention. Other resins, for example, polyethylene, polybutylene terephthalate, polyethylene terephthalate, polycarbonate and polyamide can be blended if required in an amount which does not impair the object of the present invention.

The resin composition of the present invention can be produced by mixing the respective components in a predetermined blending ratio with a tumbler mixer, a Henschel mixer or the like, and then melt-kneading the mixture using a kneader such as a single-screw extruder, a double-screw extruder, a banbury mixer, a kneader, a roll and a feeder ruder under appropriate conditions. A preferable kneader is a double-screw extruder. Further, when the respective components are kneaded, they may be charged in whole so as to be kneaded, or may be charged stepwise or dividedly so as to be kneaded. Also, after kneading in a banbury mixer, a kneader or the like, pelletization may be performed in an extruder. Fibrous inorganic fillers are preferably supplied through a side feeder to the mid-portion of the extruder in order to prevent cut during kneading. The melt-kneading temperature is usually 200-260° C. and preferably 220-240° C.

The resin composition of the present invention thus-obtained by melt-kneading the respective components has a continuous phase formed of Component A, and has dispersed phases formed of Components (B) and (C) in the Component (A) forming the continuous phase. Therefore, on the surface of resinous molded products, a metal layer can be directly formed by plating methods and the like utilizing a part of the dispersed phase of the Component (B) and/or a part of the rubber phase in the Component (B) as an anchor part. The average particle diameter of the dispersed phase is preferably 0.01-10.0 μm, further preferably 0.1-10.0 μm and particularly preferably 0.2-5.0 μm. This average particle diameter can be measured by a conventional method using an electronic microscope. Regulation of the average particle diameter of the dispersed phase can be performed by regulating melt-kneading temperature, shear rate or the like, and when a continuous kneader such as an extruder is used as a kneader, it can be regulated by the feed amount of the resin composition, the number of rotation or the like.

The resin composition of the present invention, which is a thermoplastic resin composition, can be made into a resinous molded article by conventional molding methods such as injection molding, press molding, sheet extrusion molding, vacuum molding, profile extrusion molding and foaming molding. A method of performing metal plating on the surface of the resinous molded article includes wet plating methods such as electroless plating, direct plating and electro plating and dry methods such as vacuum evaporation method, spattering method and ion plating method. According to electroless plating method, a reducing agent (sodium hypophosphate, sodium borohydrate and the like) is added to a solution containing metal ions such as nickel and copper, and the resin molded article is immersed in the aqueous solution and heated to 90-100° C. to uniformly plate a metal on the surface of the resinous molded article. In this case, it is desired that the surface of the resinous molded article is previously chemically etched and sensitized with an etching solution such as sulfuric acid/chromic acid. According to the vacuum evaporation method, the metal can be plated onto the surface of the resinous molded article by heating and evaporating various metals in high vacuum of $10^{-4}$-$10^{-5}$ mmHg. A preferable plating method in the present invention is the wet plating method, and in this case, excellent plating adhesion can be obtained.

Since the resin composition of the present invention has excellent properties as mentioned above, a laminate having a metal layer formed on the surface of a resinous molded article which may have a different shape obtained by the above molding methods can be used as metal-plated parts, for example, door mirrors, radiator grills, knobs, housings, cosmetic caps and battery cell casings, particularly cell casings for lithium ion rechargeable batteries. Meanwhile, the resinous molded article of the present invention may have a layer of another resin on a surface having no metal layer.

EXAMPLE

Hereinafter, the present invention is described in more detail by way of Examples. However, the present invention is in no way restricted to these Examples unless it does not depart from the gist of the invention. The units "parts" and "%" in Examples and Comparative Examples are based on mass unless otherwise specified.

1. Evaluation Methods

The evaluation methods used in the Examples are as follows.

(1) Particle Diameter of Rubber-Like Polymer

The particle diameter of a rubber-like polymer in latex form was measured with laser doppler/frequency analysis. A measuring device, Microtrac UPA150 particle size analyzer MODEL No. 9340 available from NIKKISO, CO., LTD. was used. It was confirmed that the particle diameter of the dispersed rubber-like polymer particle in a rubber-reinforced vinyl resin substantially corresponds to the particle diameter of the rubber-like polymer in latex form.

(2) Gel Ratio (Insoluble Matter in Toluene)

It was measured in accordance with the above-described method.

(3) Graft Ratio

It was measured in accordance with the above-described method.

(4) Limiting Viscosity [η]

A (co)polymer (B) was dissolved in methyl ethyl ketone to make five samples different in concentration. The Ubbelohde viscometer tube was used to measure a reduced viscosity at each concentration at 30° C. Using these results, the limiting viscosity [η] was obtained. The unit is dl/g.

(5) Plating Adhesion

The resin composition was molded to make a test piece of 150 mm length×90 mm width×3 mm thickness. Molding was performed using an injection molding machine 1S170 manufactured by TOSHIBA MACHINE CO., LTD.

This test piece was immersed in a degreasing solution at 50° C. for 4-5 minutes, and then washed with pure water. Then, a mixture of sulfuric acid and chromic anhydride (98% sulfuric acid/chromic anhydride=400 g/L/400 g/L) was maintained at 68° C., and the test piece was immersed therein for 10-20 minutes, and then washed with pure water. Next, 10% hydrochloric acid aqueous solution was maintained at 23° C., and the test piece was immersed therein for 2 minutes, and then washed with pure water. Then, an aqueous solution consisting of palladium chloride, stannous chloride and hydrochloric acid was maintained at 20° C., and the test piece was immersed therein for 2 minutes, and then washed with pure water. Next, 10% sulfuric acid aqueous solution was maintained at 35° C., and the test piece was immersed therein for 3 minutes, and then washed with pure water. Then, an aqueous solution consisting of nickel sulfate, sodium citrate, sodium hypophosphite, ammonium chloride and ammonia water was maintained at 35-40° C., and the test piece was immersed therein for 5 minutes, and then washed with pure water, followed by wiping out moisture to obtain an electroless plated article. Then, this electroless plated test piece was dried at 80° C. for about 2 hours, and then an aqueous solution consisting of copper sulfate, sulfuric acid and a brightening agent was maintained at 20° C. The text piece was immersed therein at a current density of 3 A/dm$^2$ for 120 minutes to perform electroplating thereon, washed with pure water, dried at 80° C. for 2 hours and sufficiently dried at room temperature. The thickness of the plating film was about 80 μm. This plating film formed on the test piece was cut to have a certain width (10 mm), and then subjected to measurement of strength when it is delaminating at an angle of 90 degrees relative to the test piece. Meanwhile, the covering state of the electroless plated article was observed, and if it failed to be plated, the evaluation was then stopped, indicating the result as x.

(6) Chemical Resistance;

The resin composition was molded to make a test piece of 160 mm length×40 mm width×2 mm thickness. 1% strain was applied to the test piece, and dioctylphthalate (DOP) was applied thereto. It was then left to stand still at 23° C. for 72 hours. Then, the surface condition of the molded article was visually evaluated in accordance with the following evaluation standards.

○; no changes.

Δ; minutely cracked.

x; largely cracked or fractured.

(7) Impact Resistance (Charpy Impact Strength);

It was measured in accordance with ISO 179 (notched, thickness 2 mm). The unit is kJ/m$^2$.

(8) Water Vapor Transmission Resistance

The test piece plated in the same manner as above in (5) was used to measure in accordance with JIS 20208 at 40° C. When plating evaluation was stopped after electroless plating, no evaluation was made, indicating the result as "-".

2. Each Component Used for Examples and Comparative Examples (1) Polypropylene Resin A-1; Block-type polypropylene "NOVATEC BC6C" (trade name) manufactured by Japan Polypropylene Corporation.

(2) Components Used for Preparation of Rubber-Reinforced Resin (B)

(2-1) Rubber-Reinforced Vinyl Resin (B-1)

In a separable flask equipped with a polymerization component inlet, a condenser, a nitrogen inlet and a stirrer, 40 parts (solid content basis) of a polybutadiene rubber latex, which was the rubber-like polymer (a) having a gel ratio of 86% and an average particle diameter of 290 nm, 0.5 part of potassium rosinate as an emulsifier and 100 parts of water was mixed, and 10 parts of styrene, 2 parts of acrylonitrile, 0.1 part of t-dodecylmercaptan as a molecular regulator and 0.2 part of cumene hydroperoxide as polymerization initiator were added. After the mixture was heated to 70° C., 0.2 part of cumene hydroperoxide, 0.2 part of sodium pyrophosphate, 0.25 part of glucose and 0.01 part of ferrous sulfate were added, and polymerization was performed. An hour later, a mixture of 16 parts of styrene, 8 parts of acrylonitrile, 0.05 parts of t—dodecylmercaptan, 40 parts of water and 0.05 part of cumene hydroperoxide was dropped over 4 hours. One hour after that, a mixture of 16.5 parts of styrene, 7.5 parts of acrylonitrile, 0.3 part of t-dodecylmercaptan, 40 parts of water and 0.05 part of cumene hydroperoxide was dropped over 4 hours. Then, 0.1 part of cumene hydroperoxide, 0.1 part of sodium pyrophosphate, 0.13 part of glucose and 0.005 part of ferrous sulfate were added, and polymerization was performed for further an hour.

After the completion of polymerization, the reaction mixture was cooled. The polymerization conversion was 98%.

The obtained polymer was coagulated with sulfuric acid, and neutralized with sodium hydroxide to adjust pH of slurry to 2. This coagulated matter was sufficiently washed with water, and dried to obtain a powdery rubber—reinforced vinyl polymer resin (B-1).

The graft ratio of this rubber-reinforced vinyl resin (B-1) was 55%, the limiting viscosity [η] of soluble matter in acetone was 0.45 dl/g, the rubber-like polymer (PBD) content was 40.5 weight %, the styrene monomer unit (ST) was 42.5 weight % and the acrylonitrile monomer unit (AN) was 17 weight %.

(2-2) Rubber-Reinforced Vinyl Resin (B-2)

It was a copolymer resin which was obtained by solution polymerization of styrene and acrylonitrile in the presence of ethylene-propylene rubber ("EP84" (trade name) manufactured by JSR) in toluene solvent, and had a ratio of ethylene-propylene rubber (EPT)/styrene (ST)/acrylonitrile (AN)=30/

46/24(%), a graft ratio of 55%, and a limiting viscosity of soluble mater in acetone (at 30° C. in methyl ethyl ketone) of 0.5 dl/g.

(2-3) Copolymer (B-3)

As copolymer (B-3), an acrylonitrile-styrene copolymer having 70 wt. % of styrene monomer unit (ST), 30 wt. % of acrylonitrile monomer unit (AN) and a limiting viscosity [η] of 0.40 dl/g was used.

(3) Compatibilizer (C)

(3-1) Compatiblizer (C-1)

Styrene-butadiene-butylene-styrene (SBBS) block copolymer, "TUFTEC PP-2000" (trade name) manufactured by Asahi Kasei Corporation was used.

(3-2) Compatibilizer (C-2)

Into a 20 L stainless-steel autoclave equipped with a ribbon type blade, a continuous feeder for auxiliary reagents, a thermometer and the like, 40 parts of propylene homopolymer (MFR (230° C., 2.16 kg) 10 g/10 min) and 140 parts of toluene were placed, and the inner temperature was heated to 120° C. While this inner temperature was maintained, the content of the autoclave was stirred at a stirring rotation speed of 100 rpm for 2 hours to perform dissolving operation. The inner temperature was lowered to 95° C. under stirring at a stirring rotation speed of 100 rpm, and then 42 parts of styrene, 18 parts of acrylonitrile and 0.5 part of t—butyl peroxyisopropylmonocarbonate were added thereto, and the inner temperature was further heated and maintained at 120° C. to perform reaction for 3 hours. Then, the inner temperature was cooled to 100° C., and 0.2 part of octadecyl-3-(3,5-di-t-butyl-4-hydroxyphenol)-propionate was added. Then, the reaction mixture was taken out of the autoclave, and unreacted matters and solvents were removed therefrom by distillation. The resulting copolymer (PP-g-AS) had a graft ratio of 43.3% and a limiting viscosity [η] of 0.243 dl/g.

Examples I-1-I-5, II-1-II-5, III-1-III-3 and IV-1 as well as Comparative Examples I-1-I-2, II-1-II-2, III-1-III-2, IV-1-IV4

After mixing the components by a Henschel mixer for 3 minutes in a blending ratio shown in Tables 1 and 2, the mixture was extruded using an NVC type 50 mm vented extruder manufactured by NAKATANI MACHINE CO., LTD. at a cylinder temperature of 180-220° C. to obtain pellets. The pellets were sufficiently dried, injection molded at a cylinder temperature of 200° C. and a die temperature of 50° C. using a J100E-05 type molding machine manufactured by The Japan Steel Works, LTD. to obtain test pieces for various evaluations. Using these test pieces, the above Izod impact strength measurement, plating adhesion test and chemical resistance test were conducted. The evaluation results are shown in Tables 1 and 2.

TABLE 1

| | Rubber-reinforced resin composition | | Examples |||||||||||||
|---|---|---|---|---|---|---|---|---|---|---|---|---|---|---|---|
| | | | I-1 | I-2 | I-3 | I-4 | I-5 | II-1 | II-2 | II-3 | II-4 | II-5 | III-1 | III-2 | III-3 | IV-1 |
| Blend formulation (part) | Component (A): Polypropylene resin | (A-1) | 70 | 60 | 85 | 70 | 70 | 70 | 80 | 60 | 85 | 90 | 70 | 80 | 85 | 70 |
| | Component (B): Rubber-reinforced resin | (B-1) ABS with PBD/ST/AN = 40.5/42.5/17 (%) | 30 | 40 | 15 | 25 | 30 | — | — | — | — | — | — | — | — | 15 |
| | | (B-2) AES with EPT/ST/AN = 30/46/24 (%) | — | — | — | — | — | 30 | 20 | 40 | 15 | 10 | 30 | 20 | 15 | 15 |
| | | (B-3) AS with limiting viscosity of 0.4 dl/g | — | — | — | 5 | — | — | — | — | — | — | — | — | — | — |
| | Compat-ibilizer (C) | (C-1) Hydrogenated SBBS block copolymer | 10 | 10 | 10 | 10 | — | 10 | 10 | 10 | 10 | 10 | — | — | — | 10 |
| | | (C-2) PP-g-AS | — | — | — | — | 10 | — | — | — | — | — | — | — | — | — |
| Blend Ratio | Component (A)/Component (B) (%) | | 70/30 | 60/40 | 85/15 | 70/30 | 70/30 | 70/30 | 80/20 | 60/40 | 85/15 | 90/10 | 70/30 | 80/20 | 85/15 | 70/30 |
| | (B-1)/(B-2) (%) | | — | — | — | — | — | — | — | — | — | — | — | — | — | 50/50 |
| Evaluation | Plating adhesion | (Kg · f/cm) | 1.2 | 0.8 | 0.8 | 0.9 | 1.2 | 1.8 | 1.7 | 1.2 | 1.3 | 0.3 | 2.2 | 1.8 | 0.3 | 1.4 |
| | Chemical resistance: visual evaluation | | ○ | Δ | ○ | Δ | ○ | ◎ | ◎ | ○ | ◎ | ◎ | ◎ | ◎ | ◎ | ○ |
| | Impact resistance: Charpy impact strength (23° C.) | (kJ/m$^2$) | 16 | 14 | 15 | 10 | 17 | 55 | 38 | 35 | 33 | 18 | 37 | 32 | 17 | 35 |
| | Impact resistance: Charpy impact strength (−30° C.) | (kJ/m$^2$) | 9 | 8 | 8 | 7 | 10 | 19 | 14 | 13 | 12 | 10 | 15 | 13 | 8 | 21 |
| | Water vapor transmission | | 0 | 0 | 0 | 0 | 0 | 0 | 0 | 0 | 0 | 0 | 0 | 0 | 0 | 0 |

TABLE 2

| Rubber-reinforced resin composition | | | Comparative Examples | | | | | | | | | |
|---|---|---|---|---|---|---|---|---|---|---|---|---|
| | | | I-1 | I-2 | II-1 | II-2 | III-1 | III-2 | IV-1 | IV-2 | IV-3 | IV-4 |
| Blend formulation (part) | Component (A): Polypropylene resin | (A-1) | 40 | 95 | 45 | 95 | 45 | 95 | 0 | 0 | 0 | 100 |
| | Component (B): Rubber-reinforced resin | (B-1) ABS with PBD/ST/AN = 40.5/42.5/17 (%) | 60 | 5 | — | — | — | — | 30 | 30 | — | — |
| | | (B-2) AES with EPT/ST/AN = 30/46/24 (%) | — | — | 55 | 5 | 55 | 5 | — | — | 30 | — |
| | | (B-3) AS with limiting viscosity of 0.4 dl/g | — | — | — | — | — | — | 70 | 70 | 70 | — |
| | Compatibilizer (C) | (C-1) Hydrogenated SBBS block copolymer | 10 | 10 | 10 | 10 | — | — | — | 10 | 10 | 10 |
| | | (C-2) PP-g-AS | — | — | — | — | — | — | — | — | — | — |
| Blend Ratio | Component (A)/Component (B) (%) | | 40/60 | 95/5 | 45/55 | 95/5 | 45/55 | 95/5 | 0/100 | 0/100 | 0/100 | 100/0 |
| | (B-1)/(B-2) (%) | | — | — | — | — | — | — | — | — | — | — |
| Evaluation | Plating adhesion | (Kg · f/cm) | 0.2 | X | 0.3 | X | 0.4 | X | 0.5 | 0.6 | X | X |
| | Chemical resistance: visual evaluation | | X | ☺ | X | ☺ | X | ☺ | X | X | Δ | ☺ |
| | Impact resistance: Charpy impact strength (23° C.) | (kJ/m$^2$) | 18 | 20 | 12 | 26 | 15 | 22 | 29 | 30 | 10 | 26 |
| | Impact resistance: Charpy impact strength (−30° C.) | (kJ/m$^2$) | 10 | 12 | 8 | 13 | 8 | 10 | 17 | 18 | 7 | 15 |
| | Water vapor transmission | | 0 | — | 0 | — | 0 | — | 0 | 0 | — | — |

From Table 1, it is found that the effects intended by the present invention were obtained in Examples I-1-I-5, II-1-II-5, III-1-III-3 and IV-1 in which the resin compositions of the present invention were used. Particularly, Example II-1-II-4, III-1-III-2 and IV-1, in which non-diene rubber-reinforced resins were used as Component (B), were more excellent in plating adhesion, chemical resistance and impact resistance. Of these, Example IV-1 was the case in which a diene rubber-reinforced resin and a non-diene rubber reinforced resin were used in combination as Component (B). Comparative Examples I-1, II-1 and III-1, in which the amount to be used of Component (A) was too small, were inferior in plating adhesion, and in some cases, chemical resistance. Comparative Examples I-2, II-2 and III-2, in which the amount to be used of Component (A) was excessive, were inferior in plating adhesion. Comparative Examples IV-1 and IV-2, in which the resin compositions were free from the polypropylene resin but contained diene rubber-reinforced resins, were inferior in plating adhesion and chemical resistance compared with Examples I-1-I-5 that contained the polypropylene resin. Comparative Example IV-3, in which the resin composition was free from the polypropylene resin but contained a non-diene rubber-reinforced resin, was inferior in plating adhesion, chemical resistance and impact resistance compared with Examples II-1-II-5 and III-1-III-3 that contained the polypropylene resin. Comparative Example IV-4, in which the resin composition contained the polypropylene but was free from Component (B), was unable to perform plating.

As it is clear from the above, the resin compositions of Examples I-1-I-5, in which predetermined amounts of diene rubber-reinforced resins were blended with polypropylene resins, were greatly improved in plating adhesion compared with the diene rubber-reinforced alone, and this result is an unexpected and surprising effect. The resin compositions in Example II-1-II-4 and III-1-III-2 comprising the polypropylene resin and the non-diene rubber-reinforced resin were greatly improved in plating adhesion and impact resistance, compared with not only the individual resins but also the diene rubber-reinforced resin alone which has been said to be excellent in plating adhesion and impact resistance, and particularly the resin compositions of III-1-III-2 were excellent in plating adhesion, and this result is also an unexpected and surprising effect.

INDUSTRIAL APPLICABILITY

The resin composition of the present invention in which a rubber-reinforced resin is blended with a polypropylene resin is excellent in productivity and provides molded articles excellent in metal plating adhesion strength and chemical resistance, and therefore is useful as a resin composition for metal plating. In addition, the metal-plated molded article of the present invention is a resinous molded article which comprises a polypropylene resin composition and has a metal-plating layer formed on the surface thereof, and thus is excellent in chemical resistance, water vapor transmission resistance, impact resistance and productivity, and particularly useful as battery cell casings especially for lithium ion rechargeable batteries.

The invention claimed is:

1. A resin composition for metal plating, which comprises 50-90 mass % of the following Component (A) and 10-50 mass % of the following Component (B), provided that the total of Components (A) and (B) is 100 mass %, wherein Component (A) is a polypropylene resin; and Component (B) is a rubber-reinforced vinyl resin obtained by polymerization of a vinyl monomer in a presence of a rubbery polymer, or a mixture of the rubber-reinforced vinyl resin and a (co)polymer of the vinyl monomer.

2. A resin composition for metal plating, according to claim 1, which further comprises a compatibilizer (C) in an amount of 0.5-30 parts by mass per 100 parts by mass of the total of the above Components (A) and (B).

3. A resin composition for metal plating, according to claim 2, in which the above compatibilizer (C) is the following Component (C1) and/or Component (C2), wherein Component (C1) is a hydrogenated, conjugated-diene polymer having a hydrogenation ratio of not less than 10%; and Component (C2) is a copolymer obtained by polymerization of a vinyl monomer in a presence of a polypropylene resin, said vinyl monomer comprising an aromatic vinyl compound and a vinyl cyanide compound.

4. A resin composition for metal plating, according to claim 1, in which the above Component (B) comprises a rubber-reinforced vinyl resin obtained by polymerization of a vinyl monomer in the presence of a nondiene rubber polymer, or a mixture of the rubber-reinforced vinyl resin and a (co)polymer of the vinyl monomer.

5. A resin composition for metal plating according to claim 4, in which said non-diene rubber polymer is an ethylene-α-olefin copolymer rubber.

6. A molded article which is formed of the resin composition for metal plating according to claim 1.

7. A metal-plated molded article formed from a resin composition for metal plating that comprises 50-90 mass % of the following Component (A) and 10-50 mass % of the following Component (B), provided that the total of Components (A) and (B) is 100 mass %, wherein Component (A) is a polypropylene resin; and Component (B) is a rubber-reinforced vinyl resin obtained by polymerization of a vinyl monomer in a presence of a rubbery polymer, or a mixture of the rubber-reinforced vinyl resin and a (co)polymer of the vinyl monomer, which is metal plated on at least part of the surface thereof.

8. A battery cell casing which comprises a molded article formed of a resin composition for metal plating comprising 50-90 mass % of the following Component (A) and 10-50 mass % of the following Component (B), provided that the total of Components (A) and (B) is 100 mass %, wherein Component (A) is a polypropylene resin; and Component (B) is a rubber-reinforced vinyl resin obtained by polymerization of a vinyl monomer in a presence of a rubbery polymer, or a mixture of the rubber-reinforced vinyl resin and a (co)polymer of the vinyl monomer, and a metal-plating layer formed on the surface of the molded article.

9. A method for producing a battery cell casing, which comprises molding a resin composition for metal plating comprising 50-90 mass % of the following Component (A) and 10-50 mass % of the following Component (8), provided that the total of Components (A) and (8) is 100 mass %, to obtain a molded article, and then plating a metal on the molded article to laminate a metal plating layer thereon, wherein Component (A) is a polypropylene resin; and Component (B) is a rubber-reinforced vinyl resin obtained by polymerization of a vinyl monomer in a presence of a rubbery polymer, or a mixture of the rubber-reinforced vinyl resin and a (co)polymer of the vinyl monomer.

* * * * *